INVENTOR
Daniel J. Healey, III

United States Patent Office 3,254,338
Patented May 31, 1966

3,254,338
CONTINUOUS WAVE DOPPLER RADAR SYSTEM
Daniel J. Healey III, Baltimore, Md., assignor to Westinghouse Electric Corporation, Pittsburgh, Pa., a corporation of Pennsylvania
Filed Jan. 28, 1964, Ser. No. 340,723
6 Claims. (Cl. 343—8)

The present invention relates generally to continuous wave doppler radar systems and more particularly to a continuous wave system capable of filtering out transmitter leakthrough which degrades performance of the system.

In a continuous wave doppler radar system the leakage signal into the receiver from the transmitter can result in degraded performance of the system if the leakage signal is sufficiently large. Third order intermodulation in the receiver will occur between the leakage and large interfering signals, such as clutter in an airborne continuous wave system, thereby providing false target signals in the opening and the closing velocity regions of the system. The result is that the clutter spectrum is much wider than anticipated even though a perfectly stabilized local oscillator may be employed in the transmitter.

Another difficulty encountered in continuous wave droppler radar systems is that the noise spectrum of the transmitter may be sufficient to mask the desired signals. Considerable development has occurred in the design of the electron beams and klystron amplifiers to obtain low noise tubes so that the noise spectrum usually is between 120 and 130 db below the carrier level at the frequency bands of interest. If an antenna and duplexer arrangement provides attenuation of transmitter noise to approximately 10 db below receiver noise at the receiver input terminals, the carrier or leakage signal at the receiver input would still be more than 100 db above the receiver noise and difficulty with leakage signal from the transmitter through the receiver will exist.

An object of the present invention is to provide a continuous wave doppler radar system wherein transmitted leakage signal into the receiver is cancelled.

Another object of the present invention is to provide a continuous wave doppler radar system which can filter out transmitter leakthrough.

Another object of the present invention is to provide a doppler feedthrough canceller.

Another object of the present invention is to assure minimum transmitter leak into the receiver.

Briefly, the present invention cancels transmitter leakage feedthrough by utilizing a parametric amplifier in the receiver as an RF amplifier. A pump signal having a frequency twice that of the carrier power from the transmitter is applied to the parametric amplifier at a predetermined phase angle with the leakage signal through the parametric amplifier to degenerate the leakage signal from proceeding further through the receiver and degradating its performance.

Further objects and advantages of the present invention will be readily apparent from the following detailed description taken in conjunction with the drawing in which.

Figure 1:
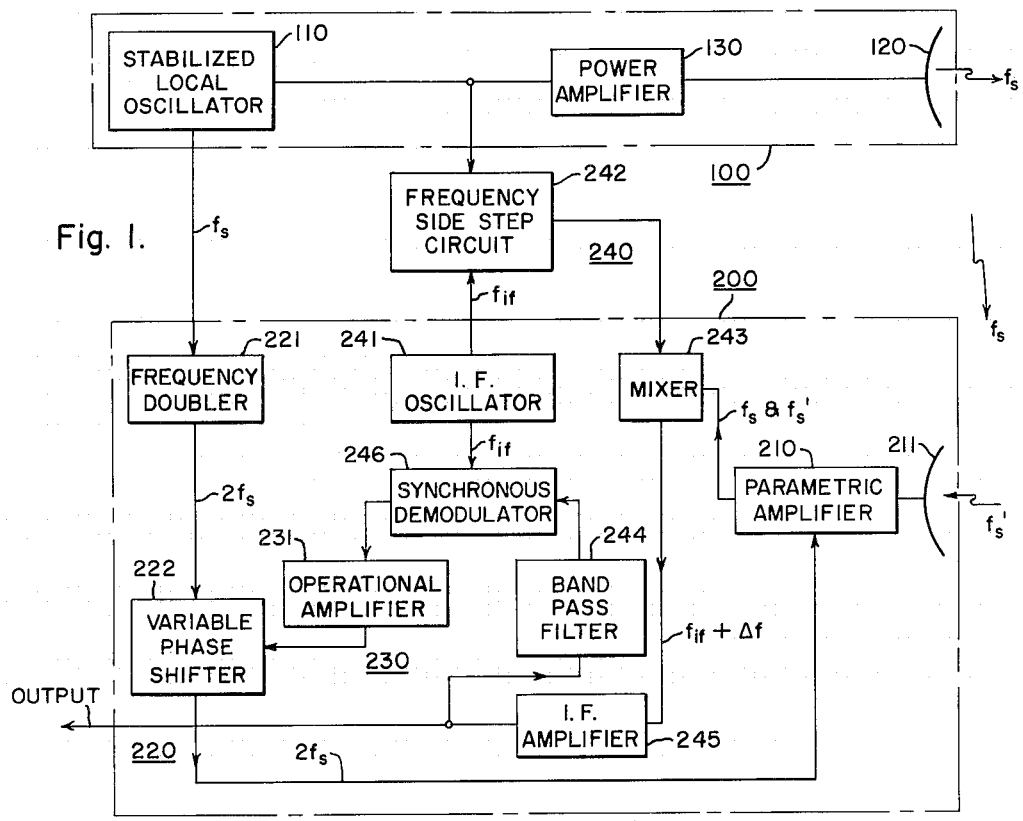
FIGURE 1 is a block diagram of a continuous wave doppler radar system embodying the present invention.

A continuous wave doppler radar system embodying the present invention is illustrated in FIG. 1. Initially, however, an explanation of a parametric amplifier as utilized in the present invention is presented for purposes of clarity.

A parametric amplifier which is pumped at a frequency which is exactly twice that of the signal received by the parametric amplifier can be degenerative at the frequency of the signal received. When degenerative, the idler frequency will be precisely equal to the signal frequency. The gain of the parametric amplifier will be a function of the phase angle between the idler frequency and the signal frequency which in turn is determined by the phase relationship of the pump signal to the signal received.

Figures 2, 3, 4:
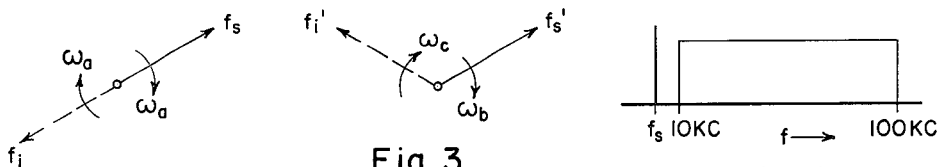
FIGS. 2 and 3 are phasor diagrams helpful in understanding the operation of the present invention.
FIG. 4 is an operating frequency spectrum useful in understanding the operation of the present invention.

From the phasor illustration of FIG. 2, when the idler frequency $f_i$ is precisely equal to the signal frequency $f_s$ both phasors will rotate at an angular frequency, $\omega_a$. The gain will be a function of the phase angle between $f_i$ and $f_s$. When the phase angle of the pump signal is properly chosen, the idler component and signal component will cancel each other. In such instance the parametric amplifier is herein defined to be in a degenerative mode of operation. When, however, the frequency of the signal received is other than precisely one-half the original pump frequency, such as for example $f_i' \pm f_s'$ in FIG. 3, then the angular rotation of $f_s'$ and $f_i'$ will be $\omega_b$ and $\omega_c$ respectively. The output from the parametric amplifier will contain both $f_s'$ and $f_i'$ and some amplification of the signal received will occur. In such instance the parametric amplifier is herein defined to be in a quasi-degenerative mode of operation.

Referring to FIG. 1, a continuous wave doppler radar transmitter 100 directs carrier power at a fixed frequency $f_s$ to a distant target from where it will return to a receiver 200 as the frequency of interest or doppler shift frequency signal $f_s'$. The doppler shift frequency signal $f_s'$ is equal to the carrier excitation frequency $f_s$ plus the doppler frequency $\Delta f$. At the same time an undesirable leakage signal from the transmitter 100 is received by the receiver 200 which degrades the performance of the system. The leakage signal is a portion of the carrier power and has the same fixed frequency $f_s$. From FIGS. 2 and 3 it can be seen that the leakage signal of fixed frequency can be "washed out" of the receiver by operating a parametric amplifier in a degenerative mode at that frequency.

More particularly, the transmitter 100 includes a stabilized local oscillator 110 which provides carrier excitation to the transmitter antenna 120 through a power amplifier 130. One suitable form of stabilized local oscillator is as described and claimed in Patent No. 2,917,713 issued December 15, 1956, to C. H. Grauling, Jr., entitled, "Frequency Control System," and assigned to the present assignee. Of course, any local oscillator capable of providing an extremely well stabilized frequency signal may be utilized.

In the receiver 200, a parametric amplifier 210 is operatively connected through a receiving antenna 211 to receive the frequency of interest or doppler shift frequency signal $f_s'$ as well as the undesired leakage frequency signal $f_s'$. A pumping circuit 220 provides a pump signal at precisely twice the frequency $f_s$ of the leakage signal to the parametric amplifier 210. The pump signal is derived from the output of the stabilized local oscillator 110. A portion of the output from the oscillator 110 is connected to a varactor frequency doubler 221 and from there to a variable phase shifter 222 for connection to the parametric amplifier 210. A control circuit 230 provides a signal to the phase shifter 222 in accordance with the leakage signal passing through the parametric amplifier 210. The phase shifter 222 adjusts the phase angle of the pump signal relative to the leakage signal to cause the parametric amplifier to operate in a degenerative mode at the fixed frequency $f_s$ of the leakage signal.

A local oscillator circuit 240 is provided to change the frequency of the received signals to an intermediate frequency. A frequency side step circuit 242 adds the frequency $f_s$ of the carrier excitation to the output of frequency $f_{if}$ of the IF oscillator 241 to provide one signal to a mixer 243. The mixer 243 heterodynes the local oscillator signal at frequency $f_s+f_{if}$ with the leakage signal at frequency $f_s$, as well as the continuous wave doppler frequency signal $f_s'$ passing through the parametric amplifier 210. The output of the mixer 243 will be a signal at frequency $f_{if}$ for the leakage signal, and $f_{if} \pm f_d$ for the desired radar signals. Typically $f_d$ may range from 10 to 100 kilocycles per second removed from the leakage signal. The intermediate frequency signal resulting from the continuous wave doppler shift signal at frequency $f_s'$ is fed from a doppler IF amplifier 245 to a utilization device (not shown) such as detector in the demodulation process of such a radar system. In the frequency changing process, phase is preserved, so that a narrow band pass filter 244 having a center frequency at $f_{if}$ is connected to the output of the doppler intermediate frequency amplifier 245 to provide an output which is a phase coherent measure of the leakage signal $f_s$.

By multiplying the signal from the narrow band pass filter 244 with the output of the IF oscillator 241 by means of the synchronous demodulator 246 a control signal is obtained which is used to control the phase of the pump signal to the parametric amplifier. The control signal is amplified by the operational amplifier 231 of the control circuit 230 and fed to the variable phase shifter 222 to establish the phase relationship of the pump signal with respect to the leakage signal through the parametric amplifier.

Figure 5:
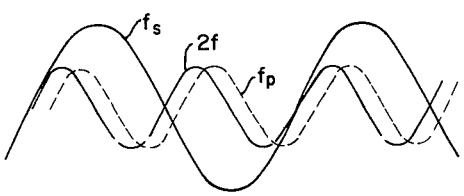
FIG. 5 illustrates representative waveforms which occur in the operation of the present invention.

Assuming there is a leakage signal present, an intermediate frequency signal will appear at the input of the demodulator 246 and the output of the demodulator will be a current of magnitude and polarity related to the phase of the second harmonic of the leakage signal appearing at the parametric amplifier input. From FIG. 5 it can be seen that if the leakage signal is of fixed frequency $f_s$, the second harmonic of the fixed frequency $2f_s$ would have the form indicated. The frequency of the pump signal has been indicated to be twice the frequency of the leakage signal but may not be precisely in phase with the second harmonic of the leakage signal $f_s$. However, the phase difference between the pump signal $f_p$ and the second harmonic of the leakage signal $f_s$ will remain constant for any particular setting of the apparatus. By adjusting the variable phase shifter 222 static phase errors can be removed so that zero output from the multiplier 246 corresponds to the pump phase that will not allow amplification by the parametric amplifier of the leakage signal at the transmitter frequency. The ferrite phase shifter 222 functions as a controller in a closed loop so that the parametric amplifier 210 is utilized as a nulling device to diminish the leakage signal at frequency $f_s$ and cause it to be degenerated. At frequencies other than the fixed frequency $f_s$, as for example the frequency of interest or continuous wave doppler shift frequency $f_s'$ the parametric amplifier 210 is quasi-degenerative and amplification of the signal will occur.

Accordingly, the present invention has provided apparatus for blocking leakage signals into the receiver 200 from the transmitter 100 thereby eliminating degradation of the frequency of interest to the receiver 200. The closed loop controlling the phase relationship of the pump signal to the leakage signal automatically provides minimum transmitter leakage into the receiver.

While the present invention has been described with a degree of particularity for the purposes of illustration, it is to be understood that all equivalents, alterations and modifications within the spirit and scope of the present invention are herein meant to be included.

I claim as my invention:

1. In a continuous wave doppler radar system including a transmitter, which transmitter includes means for providing carrier power at a fixed frequency, and a receiver, which receiver is degraded when receiving the doppler shift frequency signal by receipt of a leakage signal of said fixed frequency from said transmitter; parametric amplifier means operative to receive said leakage signal as well as said doppler shift frequency signal; means for pumping said parametric amplifier means with a pump signal at a frequency twice said fixed frequency; and means for shifting phase angle of said pump signal with respect to said leakage signal so that the phase angle of the idler frequency signal is substantially 180 degrees different from the phase angle required for degenerative parametric amplifier operation whereby only the doppler shift frequency signal is amplified and passed through said parametric amplifier means.

2. In a continuous wave doppler radar system including a transmitter having a leakage signal at its carrier frequency and a receiver which receives the undesired leakage signal along with the doppler shift frequency signal; parametric amplifier means operatively connected to receive said leakage signal and said doppler signal; means for pumping said parametric amplifier with a pump signal at a frequency twice said carrier frequency, the idler signal being equal to said carrier frequency; and means for shifting the phase angle of said pump signal with respect to said leakage signal so that the phase angle of the idler frequency signal is substantially 180° displaced from said leakage signal; said parametric amplifier being degenerate at the frequency of said leakage signal when the phase angle of said pump signal is of predetermined relationship to said leakage signal and quasi-degenerate at the frequency of the doppler signal; and utilization means operatively connected to receive said doppler signal from said parametric amplifier means.

3. In a continuous wave doppler radar system including a transmitter having a stabilized local oscillator for providing carrier power at a fixed frequency and a receiver which is degraded in performance when receiving the doppler shift frequency signal by receipt of a leakage signal of said fixed frequency from said transmitter; parametric amplifier means in said receiver operatively connected to receive said doppler signal; means for doubling the frequency of part of the output of said stabilized local oscillator means for pumping said parametric amplifier means with said doubled frequency signal; means for sensing the passage of said leakage signal through said parametric amplifier means; and means responsive to said sensing means for adjusting the phase angle of said doubled frequency signal with respect to said leakage signal to block passage of said leakage signal through said parametric amplifier means.

4. In a continuous wave doppler radar system including a transmitter having a stabilized local oscillator for providing carrier power at a fixed frequency and a receiver which is degraded when receiving the doppler shift frequency signal by receipt of a leakage signal of said fixed frequency from said transmitter; parametric amplifier means in said receiver operatively connected to the receive said doppler signal as well as said leakage signal; means for pumping said parametric amplifier means with a pump signal having a frequency twice said fixed frequency; an intermediate frequency oscillator; a frequency side step circuit operatively connected to said stabilized local oscillator and said intermediate frequency oscillator to provide a side stepped signal of a frequency displaced from said fixed frequency as determined by the frequency of said intermediate frequency oscillator; means for heterodyning the side stepped signal with the leakage signal from said parametric amplifier means to provide a control signal functionally related to the phase angle between said pump signal and said leakage signal passing through said parametric amplifier means; and means responsive to said control signal for adjusting the phase angle of said pump signal with respect to said leakage signal to degenerate said leakage signal at said parametric amplifier means.

5. In a continuous wave doppler radar system including a transmitter having a stabilized local oscillator for providing carrier power at a fixed frequency and a received which is degraded when receiving the doppler shift frequency signal by receipt of a leakage signal of said fixed frequency from said transmitter; parametric amplifier means in said receiver operatively connected to receive said doppler signal as well as leakage means signal; means for pumping said parametric amplifier means with a pump signal having a frequency twice said fixed frequency; an intermediate frequency oscillator; a frequency side step circuit operatively connected to said stabilized local oscillator and said intermediate frequency oscillator to provide a side stepped signal of a frequency displaced from said fixed frequency as determined by the frequency of said intermediate frequency oscillator; means for heterodyning the side stepped signal with the leakage signal and the doppler signal from said parametric amplifier means; means for filtering the signal of intermediate frequency from the output of said heterodyning means; means for mixing said filtered signal with the output of said intermediate frequency oscillator to coherently demodulate said leakage signal and thus provide a control signal having a magnitude and polarity functionally related to the phase of said leakage signal compared to the phase of said pump signal; and phase shifting means responsive to said control signal for adjusting the phase of said pump signal relative to the phase of said leakage signal.

6. A continuous wave doppler radar system comprising, in combination; a transmitter having a stabilized local oscillator for providing carrier power at a fixed frequency; a receiver including parametric amplifier means operatively connected to receive the doppler shift frequency signal and an undesirable leakage signal at said fixed frequency from said transmitter; means for pumping said parametric amplifier means with a pump signal at a frequency twice said fixed frequency; intermediate frequency oscillator means; means for combining the output of said intermediate frequency oscillator means with said leakage signal to provide a control signal having a magnitude and polarity functionally related to the difference in phase angle between said leakage signal and said pump signal; and phase shifter means responsive to said control signal for varying the phase of said pump signal to said parametric amplifier means with respect to said leakage signal; said parametric amplifier means so constructed and arranged to be degenerate at said fixed frequency and at other frequencies be quasi-degenerate.

References Cited by the Examiner

Skolnik: Introduction to Radar Systems, New York, McGraw-Hill, 1962, pp. 375–379.

CHESTER L. JUSTUS, *Primary Examiner.*

R. D. BENNETT, *Assistant Examiner.*